United States Patent
La Rocca

[11] 4,288,678
[45] Sep. 8, 1981

[54] APPARATUS FOR TREATING METAL WORKPIECES WITH LASER RADIATION

[75] Inventor: Aldo V. La Rocca, Moncalieri, Italy

[73] Assignee: Fiat Auto S.p.A., Turin, Italy

[21] Appl. No.: 125,315

[22] Filed: Feb. 28, 1980

[30] Foreign Application Priority Data

Mar. 5, 1979 [IT] Italy .............................. 67467 A/79

[51] Int. Cl.³ ................................................ B23K 7/00
[52] U.S. Cl. ........................ 219/121 LE; 219/121 FS; 350/296
[58] Field of Search ................... 219/121 LE, 121 LF, 219/121 L, 121 LM, 121 LQ, 121 FS, 121 LP; 350/296, 293, 310, 291, 288; 148/11.5 R, 13, 2, 3, 112, 121

[56] References Cited
U.S. PATENT DOCUMENTS

| | | | |
|---|---|---|---|
| 1,530,441 | 3/1925 | Thomson | 350/310 |
| 3,626,141 | 12/1971 | Daly | 219/121 FS X |
| 3,757,078 | 9/1973 | Conti et al. | 219/212 LQ X |

*Primary Examiner*—C. L. Albritton
*Attorney, Agent, or Firm*—Sughrue, Rothwell, Mion, Zinn and Macpeak

[57] ABSTRACT

Apparatus for treating a metal workpiece includes a laser radiation generator arranged to generate and focus a laser beam onto a workpiece, and a part-spherical mirror so positioned as to refocus onto said workpiece the radiation reflected therefrom. The provision of the mirror increases the percentage of the laser radiation energy absorbed by the workpiece.

3 Claims, 4 Drawing Figures

APPARATUS FOR TREATING METAL WORKPIECES WITH LASER RADIATION

The present invention relates to apparatus for treating metal workpieces with laser radiation and in particular, but not exclusively, related to such apparatus for carrying out heat treatments such as plating, alloying and surface hardening without the use of additional materials.

According to known methods of effecting heat treatments on metal workpieces by using laser radiation, the laser beam generated by a power laser is directed in a direction substantially perpendicular to the metal surface to be treated, with the result that the greater portion (about 60–80%) of the laser radiation is reflected back from the surface and only a minor portion (about 40–20%) of the radiation is absorbed by the workpiece.

In order to increase the absorption of laser radiation in surface hardening treatments it is known to blacken the surface to be treated by a preliminary operation which consists of applying a coating of black paint, of lamp black, or other substances such as manganese phosphate. Although this preliminary operation does increase the efficiency of the surface hardening treatments, the degree of improvement is not satisfactory.

Accordingly, it is an object of the present invention to provide apparatus for treating metal workpieces with laser radiation, which will improve the relation between the energy supplied by the power laser and the energy absorbed by the workpiece.

This object is achieved in accordance with the invention by providing said apparatus both with a laser radiation generator arranged to generate and focus a laser beam onto a workpiece to be treated, and with reflecting means arranged to refocus onto the workpiece the radiation reflected therefrom.

The provision of said reflecting means not only increases the overall proportion of laser radiation energy absorbed by the workpiece, but also enables physical and chemical parameters of the treated area of the workpiece to be measured by measuring the radiation which reaches the said reflecting means after reflection from the treated area of the workpiece.

Two forms of laser-beam treatment apparatus, each embodying the invention will now be particularly described by way of example, with reference to the accompanying diagrammatic drawings, in which.

Figure 1:
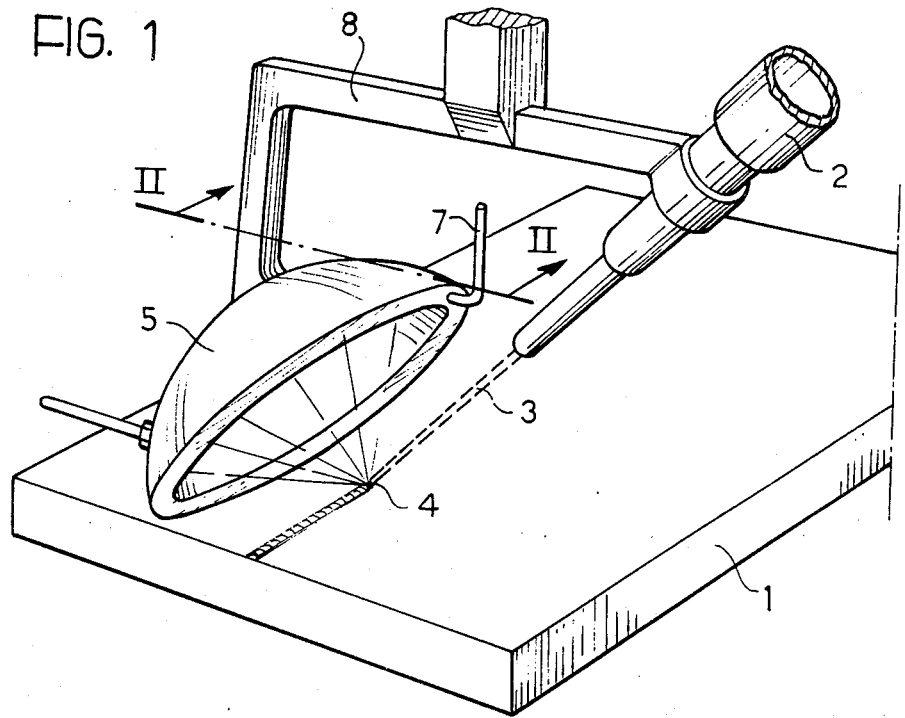
FIG. 1 is a perspective view of the first form of apparatus.
Figure 2:
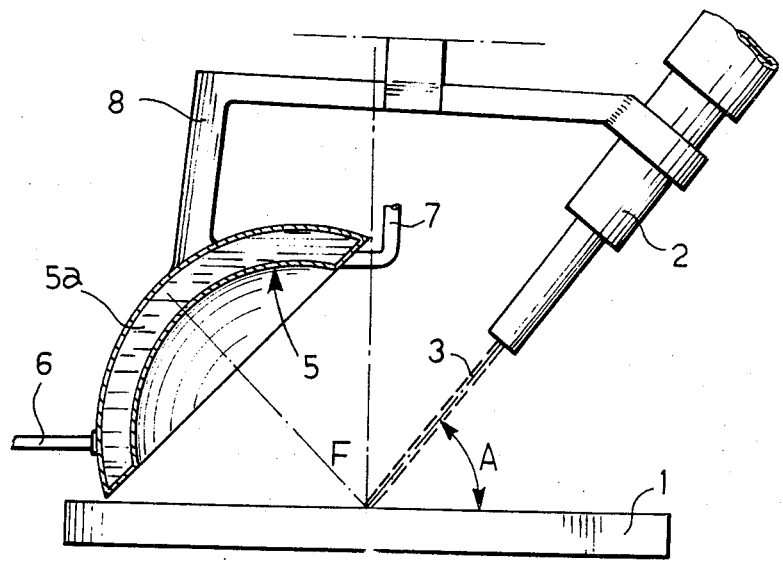
FIG. 2 is a cross-section on line I-II of FIG. 1.

The first form of apparatus shown in FIGS. 1 and 2 comprises a laser radiation generator 2 arranged to generate and focus a high-power laser beam 3 upon a point 4 on the surface of a metal workpiece 1 to be treated.

As indicated in FIG. 2 the axis of the laser beam 3 is inclined at an angle A relative to the workpiece surface.

In addition to the laser generator 2 the apparatus comprises reflecting means in the form of a mirror 5 shaped as a spherical cap with its centre of curvature at the point 4 upon which the laser beam 3 is focused.

The mirror 5 is so orientated that it picks up the laser radiation reflected from the workpiece 1 and reflects this radiation back to the point 4 of focusing of the laser beam 3.

As shown in FIG. 2, the mirror 5 is hollow with a cavity 5a through which cooling fluid is arranged to flow between an inlet pipe 6 and an outlet pipe 7.

The laser radiation generator 2 and the mirror 5 are carried on a common mounting 8.

Owing to the arrangement described above in which the mirror 5 refocuses onto the point 4 the radiation reflected from the workpiece 1, it is possible to obtain an improved relationship between the energy supplied by the laser radiation and the energy absorbed by the workpiece.

Figure 3:
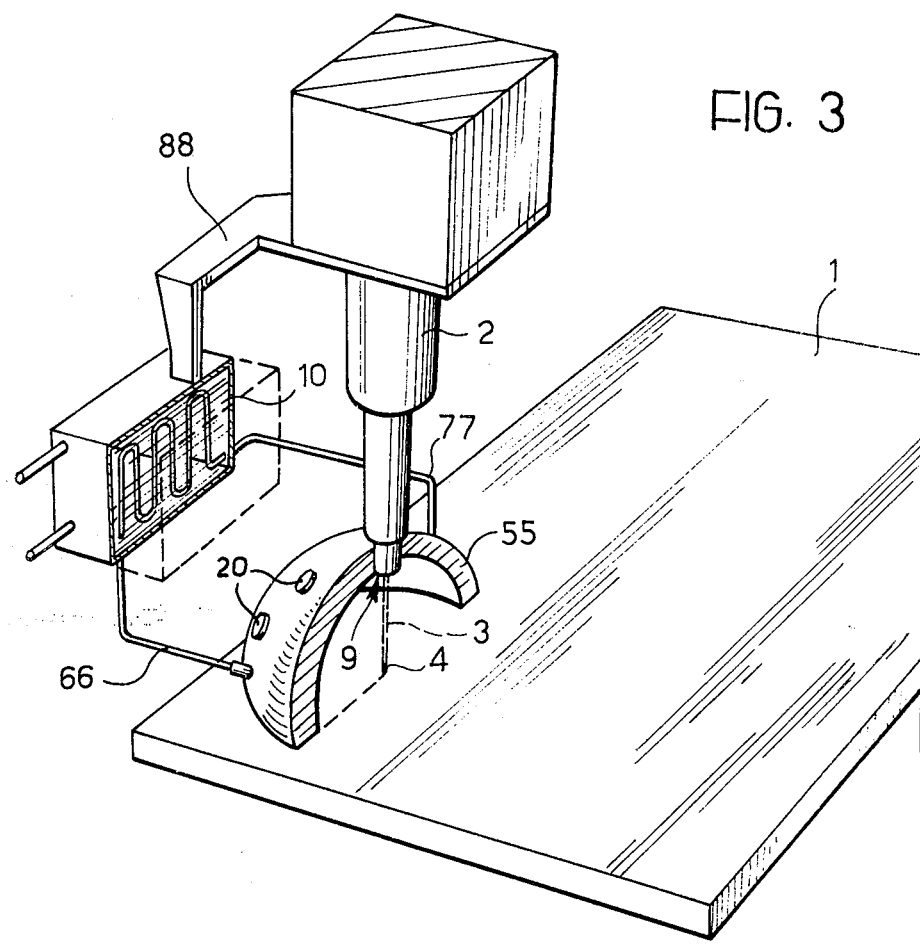
FIG. 3 is a perspective view of the second form of apparatus.

In the second form of apparatus shown in FIG. 3, the laser radiation generator 2 is so orientated relative to the workpiece 1 that the axis of the laser beam 3 is perpendicular to the surface of the workpiece 1 to be treated. In this apparatus, the reflecting means consists of a mirror 55 shaped as a hemi-spherical cap (only half of the mirror 55 is shown in FIG. 3) with its centre of curvature coincident with the focal point 4 of the laser radiation. An aperture 9 is provided in the top of the hemi-spherical mirror 55 to allow for the passage of the laser beam 3. The straight line which joins the axis of the said aperture 9 to the centre of curvature of the cap 55 constitutes the axis of symmetry of the mirror 55 and coincides with the axis of the laser beam 3.

As for the mirror 5 of the first form of apparatus, the mirror 55 of the second form of apparatus is hollow with a cavity through which cooling fluid can flow between inlet and outlet pipes 66 and 77 respectively. Fluid passing out of the mirror 55 through the pipe 77 is cooled in a heat exchanger 10 prior to being fed back to the inlet pipe 66. The heat exchanger 10 is carried on the same support 88 as that which carries the laser radiation generator 2 and the hemi-spherical mirror 55.

Figure 4:
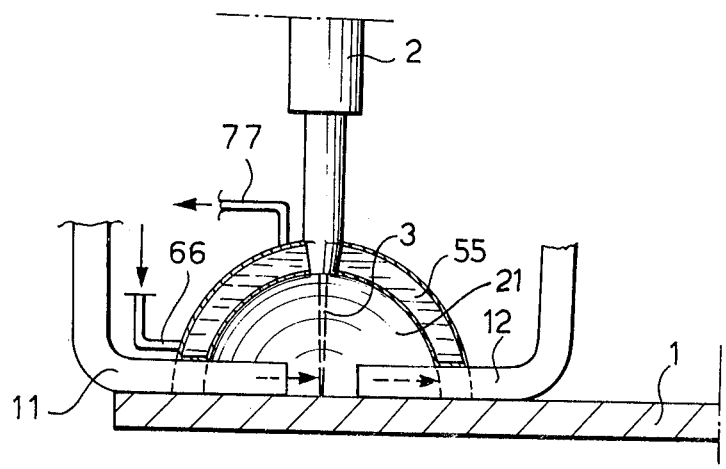
FIG. 4 is a cross-sectional view of a variant of the second form of apparatus shown in FIG. 3.

The apparatus shown in FIG. 4 is similar to that of FIG. 3, with the addition of means for supplying a shielding gas to the inside of the mirror 55. This shielding gas is intended to eliminate the plasma plume which forms as a result of the action of the laser radiation on the workpiece 1, such a plume being undesirable as it causes changes in the optical geometry of the system and thereby upsets the focusing reflection of the laser radiation by the mirror 55.

Duct means diagrammatically shown at 11 and 12 serve respectively to supply and withdraw the shielding gas from the workpiece area under treatment, and further means (not shown) to recycle the gas to the supply means 11, this arrangement being described more fully in our Italian Patent application No. 67465-A/79 filed on March, 5th, 1979.

Advantageously, sensing means 20 are attached to the reflecting means (mirrors 5, 55) and serve to measure physical or chemical parameters of the treated area of the workpiece by measurement of the radiation which reaches the said reflecting means after being reflected from the treated area of the workpiece 1.

To facilitate this measurement, either the reflecting surface of the mirrors 5 or 55 can be treated with a suitable radiation-responsive coating (for example with a coating 21 of thermionic materials see FIG. 4), or else partially-reflecting mirrors can be used for the mirrors 5, 55 with the amount of radiation transmitted through the mirrors being arranged to be sufficiently small in quantity to permit measurements of the properties to be readily carried out (it being appreciated that without some reduction in the strength of the radiation, most conventional sensors would be swamped). Suitable partially-reflecting mirrors can be made, for example, from a material, such as quartz, coated with a thin layer of highly reflecting material such as gold.

By either coating the mirrors 5, 55 or using partially reflecting mirrors, in the manner described above, it becomes possible to measure the strength and distribution of the radiation coming from the workpiece by using sensing means 20 positioned at the mirror 5, 55 to measure variations either in physical parameters (temperature and surface resistance) or else of chemical and electro-chemical parameters (for example, differences of potentials obtained with thermionic effects in the case in which thermionic coatings are used). The sensing means 20 comprise, for example, thermocouples, pirometers, or electric field strength meters.

The measurement of these parameters with sensors mounted on the mirror 5, 55 is advantageous compared with measuring these parameters with sensors arranged on the workpiece since in the latter case considerable difficulties would arise due to the need to equip all the workpieces with sensors and to track the workpieces as they move, due to the limited size of the measuring area, and due to the extremely high values of the parameters to be measured.

I claim:

1. Apparatus for treating a metal workpiece with laser radiation, comprising a laser radiation generator arranged to generate and focus a laser beam onto a point on said workpiece, reflecting means arranged to refocus onto said point on said workpiece the radiation reflected therefrom and sensing means attached to said reflecting means for measuring physical and chemical parameters of the treated area of the workpiece by measurements of the radiation which reaches the said reflecting means after being reflected from the treated area of the workpiece.

2. Apparatus according to claim 1, wherein the reflecting surface of the said reflecting means is treated with a thermionic coating.

3. Apparatus according to claim 1, wherein the said reflecting means are partly reflecting, the said sensing means being so arranged as to measure the portion of radiation transmitted through the reflecting surface of said reflecting means.

* * * * *